Dec. 3, 1940. M. C. MEYER Re. 21,647

CELLULOSIC CONTAINER

Original Filed April 22, 1937

INVENTOR.
Maximilian C. Meyer
BY
Darby & Darby
ATTORNEY.

Reissued Dec. 3, 1940

Re. 21,647

UNITED STATES PATENT OFFICE 21,647

CELLULOSIC CONTAINER

Maximilian C. Meyer, Brooklyn, N. Y.

Original No. 2,133,629, dated October 18, 1938, Serial No. 138,324, April 22, 1937. Application for reissue December 22, 1939, Serial No. 310,612

12 Claims. (Cl. 229—3.5)

This invention relates to novel reinforced plastic containers, as for example of cellulose derivatives.

The detailed objects of the invention will be apparent from the following description.

This invention resides substantially in the construction, combination, arrangement, relative location of parts, steps and series of steps, all in accordance with the following description.

In the accompanying drawing.

The construction of containers from plastics such as cellulosic derivatives, e. g. cellulose acetate, Celluloid, and the like is at the present time attaining considerable commercial importance. It is now a common practice to construct hat boxes, shoe boxes, linen boxes, handkerchief boxes, glove boxes, cake boxes, and the like from materials of this nature. The common practice at the present time is to form the peripheral walls of a shoe box for example from a continuous strip of material into an open rectangle by cementing the free ends together after formation of the strip into that rectangular form. To the bottom edge of the peripheral wall thus formed is cemented the bottom wall. This leaves the upper peripheral edge of the wall in what may be termed a raw or unfinished state. The material of which such boxes are constructed is rather thin of the order for example of five, ten, fifteen or twenty thousandths of an inch thick. It is obvious that the walls therefore do not have much inherent rigidity and that the free upper raw edge is unsightly and extremely vulnerable to mechanical damage. This edge, if it has any slight imperfections such as nicks, fissures, or the like, quickly develops a fracture or tearing of the material which destroys the container.

One effort to overcome this difficulty consists in spinning over the free or raw edge of the peripheral wall into a curved cross-sectional form such as a bead. However, this has been found impractical because the stresses and strains developed during the beading operation weaken the material to the extent that it is even more susceptible to fracture or tearing. It may be stated that the general object of this invention is to provide an improvement in construction whereby a finished sightly edge is produced which imparts overall rigidity to the peripheral walls of the container and substantially eliminates the danger of fracture and tearing. In addition the peripheral wall strips constructed in accordance with this invention are better adapted to handling and manufacturing operations, facilitating more economical production.

Figure 1:
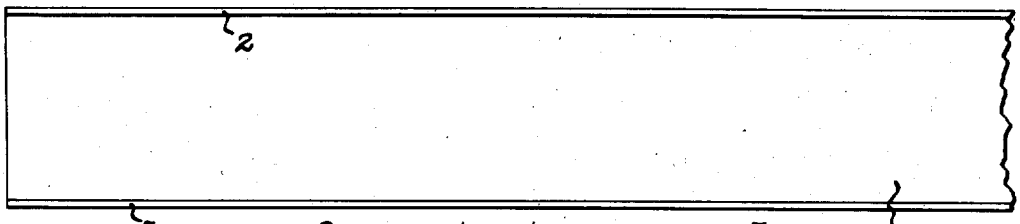
Figure 1 is a plan view of the structural element from which the peripheral walls of containers in accordance with this invention are constructed.
Figure 2:
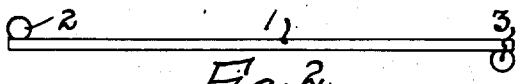
Figure 2 is an end edge elevational view thereof.

In Figure 1 there is illustrated a portion of a strip of Celluloid for example constructed in accordance with this invention. The width of the strip 1 of course depends upon the depth of the container it is desired to produce. Cemented to one face of the strip along one of its longer edges is a rod or strand 2 of Celluloid of any desired cross-section. As illustrated by way of example in Figure 2, this strand 2 is of circular cross-section which from a manufacturing viewpoint is a desirable shape because of the ease in producing it. Cemented along the other long edge on the opposite face of the strip 1 is a similar strand 3. These strands are cemented to the edges of the strips with any suitable solvent cement depending upon the particular nature of the material employed. In the case of Celluloid a suitable cement comprises a mixture in equal parts of acetone and methyl-celo-solv-acetate.

Acetone, as is well known, very rapidly attacks materials made of cellulose derivatives, with a tendency to oversoften it and in many cases to blush it. For this reason the acetone is preferably diluted with a more slowly acting solvent such as methyl-celo-solv-acetate. It is of course well known to those skilled in the art that many other solvents are suitable, and that the particular solvents, mixtures, and proportions thereof will vary with the different cellulose derivative used. I therefore refer only to the specific solvent mentioned above for purposes of illustration. By means of such solvents the strands 2 and 3 are quickly attached to the edges of the strip. It is here noted that it is not necessary that the strands 2 and 3 be placed on opposite faces of the strip, but it is a desirable practice because the finished container presents a more pleasing appearance.

To form a container of the structural element shown in Figure 1 a portion of a strip of the desired length is provided and shaped around a form having the shape of the finished container.

In the case of a rectangular container as shown in the drawing, the form would consist of a central body or mold of any suitable material such as wood of dimensions equal to the interior dimensions of the container. At the corners of the mold or form are provided heated members preferably cylindrical in cross section such as pipes, having an outside diameter equal to the desired diameter of the curvature of the box at the corners. As noted for example, these heated elements may comprise brass pipes standing vertically at the corners of the form and set in thereto so as to produce the shape, as will be apparent from Figure 4, at the corners.

These pipes are supplied with steam to keep them heated and the strip is bent around the form and pressure is applied at the corners where the strip engages the heated members to shape them therearound, and give them a permanent set.

Figure 3:
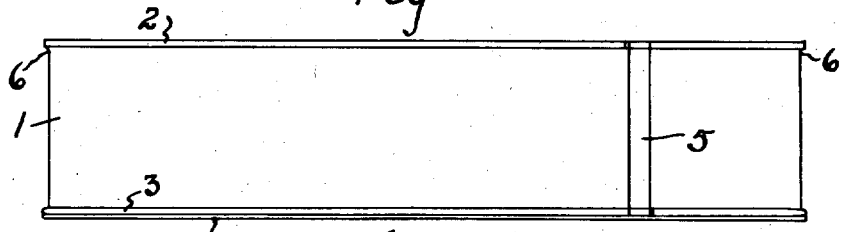
Figure 3 is a side elevational view of a container in accordance with this invention.

A feature of practical importance is illustrated at 6 in Figure 3. Where the strand 2 at the upper edge is on the inner face of the strip if the peripheral wall portion 1 during the heating and forming operation is pressed closely under the strand a small lip will be formed as indicated at 6 in Figure 3 at each of the corners. This provides a convenient way for fitting the cover on the box which would be similarly constructed forming a snug fit and snapping down over the upper peripheral edge of the main body of the container to hold the body tight.

Figure 4:
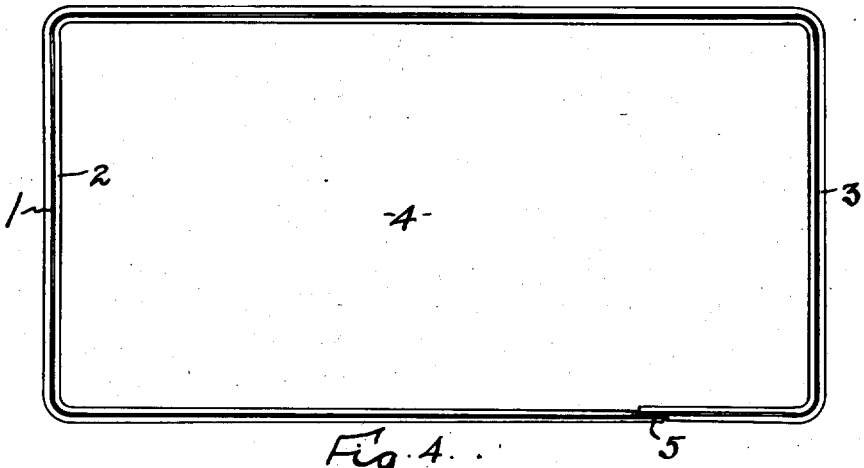
Figure 4 is a top plan view thereof.
Figure 5:
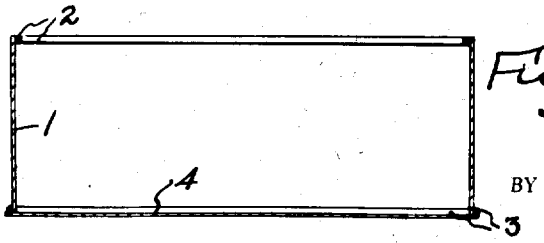
Figure 5 is a vertical, transverse, sectional view through the container.

The ends of the strips are overlapped as indicated in Figure 5 and small lengths of the strands 2 and 3 are cut off as indicated in Figures 3 and 4, so that the lapped joint forms as little bulk as possible. The overlapping edges are then cemented together by means of the solvent mentioned above to form an open rectangular peripheral wall clearly apparent from the drawing. The bottom wall 4 of the container may be made from a cellulose derivative and in the case of the example selected would be made of Celluloid. Its dimensions are such that its end edges are flush with the outer surface of the strand 3 which is cemented to the bottom edge of the peripheral wall. The bottom wall 4 is cemented to the lower edge of the peripheral wall all around by the use of the solvent mentioned. It will be apparent that the presence of the strand 3 in addition to adding strength to the structure provides an increased area of adhesion to the bottom wall. Thus not only the bottom edge of the wall 1 is cemented to the bottom wall 4, but the adjacent surface of the strand 3 is cemented thereto, forming an increased area of adherence.

The strand 2 at the upper peripheral edge gives the container a finished appearance, imparts considerable rigidity to the peripheral wall, and at the same time, being cemented to the wall in the region of its edge throughout its edge, protects that edge against fracture, tearing and other physical damage. In addition it imparts a neat, decorative appearance.

Boxes made of extremely thin Celluloid big enough to contain a blanket have been found to be entirely practical by reason of this construction. It is again noted for emphasis that the strands 2 and 3 may both be applied to the same side face of the peripheral wall and may occur either on the outside face of the wall or on the inside face.

From the above description it will be apparent to those skilled in the art that the principles of this invention are adapted to wide variation without departure from the scope thereof. I do not, therefore, desire to be strictly limited to the disclosure as given for purposes of illustration, but rather to the scope of the appended claims.

I claim:

1. A container as described constructed of a cellulose derivative having a peripheral wall, comprising a strip of material having reinforcing strands cemented along the edges thereof, and a bottom wall cemented to the edge of the peripheral wall and the adjacent strand.

2. A container formed of a cellulose derivative, said container having a peripheral wall comprising a strip of material having reinforcing strands cemented along the edges thereof, and a bottom wall cemented to the edge of the peripheral wall, the strand at the bottom edge of the peripheral wall being on the outer face of the wall.

3. A container formed of a cellulose derivative, said container having a peripheral wall comprising a strip of material having reinforcing strands cemented along the edges thereof, and a bottom wall cemented to the edge of the peripheral wall, the strand at the upper edge of the peripheral wall being secured to the inner face thereof and the other strand to the outer face and to the bottom wall.

4. A container formed of plastic material, said container comprising a peripheral wall and a bottom wall, said bottom wall projecting outwardly beyond the outer surface of said peripheral wall to form a peripheral channel therewith, a strand having a curved periphery positioned in said peripheral channel and being adhesively secured to said peripheral wall and to said bottom wall adjacent the junction of the peripheral wall and said bottom wall, the surface portions of said strand facing and secured to said peripheral wall and said bottom wall providing a medium joining said peripheral wall to said bottom wall along an adhesion area materially larger than the junction between said peripheral and said bottom wall, said strand being of sufficiently large bulk as to constitute a strengthening reinforcement of said junction between said peripheral wall and said bottom wall.

5. A container formed of plastic material, said container comprising a peripheral wall and a bottom wall, said bottom wall projecting outwardly beyond the outer surface of said peripheral wall to form a peripheral channel therewith, a strand having a curved periphery positioned in said peripheral channel and being adhesively secured to said peripheral wall and to said bottom wall adjacent the junction of the peripheral wall and said bottom wall, the surface portions of said strand facing and secured to said peripheral wall and said bottom wall providing a medium joining said peripheral wall to said bottom wall with an adhesion area several times as large as the junction area between said peripheral wall and said bottom wall, said strand being of sufficiently large bulk as to constitute a strengthening reinforcement of said junction between said peripheral wall and said bottom wall.

6. A container formed of plastic material, said container comprising a peripheral wall and a bottom wall, said bottom wall projecting outwardly beyond the outer surface of said peripheral wall to form a peripheral channel therewith, a strand having a curved periphery adhesively secured to said peripheral wall and to said bottom wall adjacent the junction of the peripheral wall and said bottom wall, said peripheral wall having a free edge, said edge having relatively low resistance against strains, a strand having a curved periphery adhesively secured to said wall adjacent said free edge, said strand being adhesively secured to said wall in such a position that one side of said strand is substantially even with and parallel to said free edge, said strand being of sufficiently large diameter to constitute a strengthening reinforcement for said free edge against strains.

7. A container formed of plastic material, said container comprising a side wall and an end wall, said end wall projecting outwardly beyond the outer surface of said side wall to form a peripheral channel therewith, a strand having a curved periphery positioned in said peripheral channel at the junction of said side wall and said end wall, said strand being secured to both said side wall and said end wall.

8. A container formed of plastic material, said container comprising a side wall and an end wall, said end wall projecting outwardly beyond the outer surface of said side wall to form a peripheral channel therewith, a plastic strand having a substantially circular cross section positioned in said peripheral channel at the junction of said side wall and said end wall, said plastic strand being secured to both said side wall and said end wall.

9. A container formed of plastic material, said container comprising a side wall and an end wall, said end wall projecting outwardly beyond the outer surface of said side wall to form a peripheral channel therewith, a plastic strand having a substantially circular cross section positioned in said peripheral channel and being adhesively secured to said side wall and to said end wall adjacent the junction of the side wall and said end wall, the surface portions of said strand facing and secured to said side wall and said end wall providing a medium joining said side wall to said end wall along an adhesion area materially larger than the junction between said side and said end wall, said strand being of sufficiently large bulk as to constitute a strengthening reinforcement of said junction between said side wall and said end wall.

10. A container having a thin self-sustaining wall of plastic material, said wall having a free cut edge defining an opening in said container, said edge having relatively low resistance against strains, a strand substantially circular in cross section having a plastic peripheral surface, said strand being adhesively secured to said plastic wall in tangential contact relation thereto adjacent said free cut edge, said strand being secured to said wall in such a position that one side of said strand is substantially even with and parallel to said free cut edge, said strand being of sufficiently large diameter to constitute a strengthening reinforcement for said free cut edge against strains.

11. A container formed of plastic material comprising a first thin flexible self-supporting plastic curved wall forming an enclosure, said wall having a thickness of at least 5 thousandths of an inch, and a second thin flexible self-supporting plastic flat wall having a thickness of at least 5 thousandths of an inch, one end of the curved plastic wall being secured to the flat plastic wall and forming a container having therein an inner continuous peripheral channel at the juncture of said walls, said first plastic wall being secured to said second plastic wall, a strand having a curved peripheral surface positioned in said channel formed by the junction of said first plastic wall and said second plastic walls, said strand having a plastic surface, one portion of the curved peripheral surface of said plastic strand being fused to said first plastic wall and a second portion of the curved peripheral surface of said plastic strand being fused to said second plastic wall, said curved peripheral portions of said strand providing an adhesion area with said first plastic wall and said second plastic wall substantially greater than the junction area between said first plastic wall and said second plastic wall, said strand being of sufficiently large bulk as to constitute a strengthening re-enforcement of said joint between said first plastic wall and said second plastic wall.

12. A container formed of plastic material comprising a first thin flexible self-supporting plastic curved wall forming an enclosure, said wall having a thickness of at least 5 thousandths of an inch and a second thin flexible self-supporting plastic flat wall having a thickness of at least 5 thousandths of an inch, one end of the curved plastic wall being secured to the flat plastic wall and forming a container having therein an inner continuous peripheral channel at the juncture of said walls, said first plastic wall being secured to said second plastic wall, a strand having a curved peripheral surface positioned in said channel formed by the junction of said first plastic wall and said second plastic wall, said strand having a plastic surface, one portion of the curved peripheral surface of said plastic strand being fused to said first plastic wall and a second portion of the curved peripheral surface of said plastic strand being fused to said second plastic wall, said curved peripheral portions of said strand providing an adhesion area with said first plastic wall and said second plastic wall substantially greater than the junction area between said first plastic wall and said second plastic wall, said strand being of sufficiently large bulk as to constitute a strengthening re-enforcement of said joint between said first plastic wall and said second plastic wall, one plastic wall of said container having a free edge, said edge having a relatively low resistance against strains, a second strand having a curved periphery adhesively secured to said wall adjacent said free edge, said second strand being adhesively secured to said wall in such a position that one side of said strand is substantially even with and parallel to said free edge, said strand being of sufficiently large diameter to constitute a strengthening re-enforcement for said free edge against strains.

MAXIMILIAN C. MEYER.